(12) United States Patent
Nishigai

(10) Patent No.: US 10,418,819 B2
(45) Date of Patent: Sep. 17, 2019

(54) CONTROL METHOD FOR POWER CONTROL SYSTEM, POWER CONTROL SYSTEM, AND POWER CONTROL APPARATUS

(71) Applicant: KYOCERA CORPORATION, Kyoto-shi, Kyoto (JP)

(72) Inventor: Takanobu Nishigai, Hiratsuka (JP)

(73) Assignee: KYOCERA Corporation, Kyoto (JP)

( * ) Notice: Subject to any disclaimer, the term of this patent is extended or adjusted under 35 U.S.C. 154(b) by 401 days.

(21) Appl. No.: 15/329,842

(22) PCT Filed: Jul. 23, 2015

(86) PCT No.: PCT/JP2015/003698
§ 371 (c)(1),
(2) Date: Jan. 27, 2017

(87) PCT Pub. No.: WO2016/017124
PCT Pub. Date: Feb. 4, 2016

(65) Prior Publication Data
US 2017/0250535 A1  Aug. 31, 2017

(30) Foreign Application Priority Data

Jul. 29, 2014 (JP) ................................ 2014-154336

(51) Int. Cl.
*H02J 3/38* (2006.01)
*H02J 13/00* (2006.01)
(Continued)

(52) U.S. Cl.
CPC .............. *H02J 3/383* (2013.01); *H02J 3/387* (2013.01); *H02J 7/35* (2013.01); *H02J 13/0006* (2013.01);
(Continued)

(58) Field of Classification Search
CPC ........ H02J 3/383; H02J 3/387; H02J 13/0006; H02J 7/35; H02M 3/04; H02M 7/44; Y02E 10/563
See application file for complete search history.

(56) References Cited

U.S. PATENT DOCUMENTS

2009/0305087 A1* 12/2009 Rajashekara ...... H01M 8/04611
429/423
2011/0210702 A1*  9/2011 Shimayama .............. H02J 3/32
320/134
(Continued)

FOREIGN PATENT DOCUMENTS

JP      S63-314136 A     12/1988
JP      2001-333536 A    11/2001
(Continued)

OTHER PUBLICATIONS

International Search Report dated Oct. 13, 2015 issued by the Japanese Patent Office in counterpart International Application No. PCT/JP2015/003698.
(Continued)

*Primary Examiner* — Rexford N Barnie
*Assistant Examiner* — Thai H Tran
(74) *Attorney, Agent, or Firm* — Procopio Cory Hargreaves and Savitch LLP

(57) ABSTRACT

This power control system (100) includes a power generation apparatus (33) that generates, while a current sensor (40) detects forward power flow equal to or greater than a threshold, power corresponding to a value detected by the current sensor, and a power control apparatus (20) that controls distributed power sources. The power control apparatus is connected to a dummy current output unit capable of supplying the current sensor with dummy current. The control method includes, in a state of constant current flowing to a load from the power generation apparatus and
(Continued)

the power control apparatus for a predetermined time, a first step of the power control apparatus increasing the dummy current from the dummy current output unit stepwise, and after the first step, a second step of storing, as the threshold, a minimum of the forward power flow when output voltage of the power generation apparatus rises.

12 Claims, 10 Drawing Sheets

(51) Int. Cl.
*H02J 7/35* (2006.01)
*H02M 3/04* (2006.01)
*H02M 7/44* (2006.01)

(52) U.S. Cl.
CPC ............... *H02M 3/04* (2013.01); *H02M 7/44* (2013.01); *Y02E 10/563* (2013.01)

(56) References Cited

U.S. PATENT DOCUMENTS

2014/0049053 A1* 2/2014 Inoue ..................... H02J 3/383
290/30 R
2014/0152097 A1* 6/2014 Kitaji ....................... H02J 1/10
307/19

FOREIGN PATENT DOCUMENTS

| JP | 2007-049770 A | 2/2007 |
| JP | 2008-253033 A | 10/2008 |
| JP | 2011-188607 A | 9/2011 |

OTHER PUBLICATIONS

Written Opinion of the International Search Authority dated Oct. 13, 2015 issued by the Japanese Patent Office in counterpart International Application No. PCT/JP2015/003698.

* cited by examiner

FIG. 10

| Current detected in the forward direction by the current sensor [A] | Power generated by the power generation apparatus [W] |
|---|---|
| 0.15 | 400 |
| 0.19 | 500 |
| 0.23 | 600 |
| 0.26 | 700 |

CONTROL METHOD FOR POWER CONTROL SYSTEM, POWER CONTROL SYSTEM, AND POWER CONTROL APPARATUS

CROSS-REFERENCE TO RELATED APPLICATION

This application claims priority to and the benefit of Japanese Patent Application No. 2014-154336 filed Jul. 29, 2014, the entire contents of which are incorporated herein by reference.

TECHNICAL FIELD

This disclosure relates to a control method for a power control system, to a power control system, and to a power control apparatus.

BACKGROUND

As a power control apparatus for power generation in a power generation system provided with power generation equipment, such as a solar panel, a power control apparatus that allows grid interconnected operation, to connect to a commercial power grid (abbreviated below as grid) and output DC power, and independent operation, to output DC power with no relation to the grid, has been proposed (for example, see JP 2007-049770 A (PTL 1)).

As a power control apparatus for power storage in a power storage system provided with power storage equipment, such as a storage cell that is charged with grid power, a power control apparatus like the aforementioned power control apparatus for power generation that allows grid interconnected operation, to connect to the grid and output DC power, and independent operation, to output DC power with no relation to the grid, has also been proposed (for example, see JP 2008-253033 A (PTL 2)).

CITATION LIST

Patent Literature

PTL 1: JP 2007-049770 A
PTL 2: JP 2008-253033 A

SUMMARY

Technical Problem

There is demand for a power control system to manage and operate a plurality of distributed power sources such as a solar cell, a storage cell, a fuel cell, a gas power generator, and the like integrally. In particular, there is demand for construction of a system that can manage and control efficient operation of a plurality of distributed power sources without compromising the versatility of the distributed power sources.

Therefore, it would be helpful to provide a control method for a power control system, a power control system, and a power control apparatus that can manage and control efficient operation of a plurality of distributed power sources without compromising the versatility of the distributed power sources.

Solution to Problem

A control method according to one of the embodiments of this disclosure is a control method for a power control system, the power control system including: a power generation apparatus configured to generate, while a current sensor detects forward power flow equal to or greater than a threshold, power corresponding to a value detected by the current sensor; a power control apparatus configured to control distributed power sources including the power generation apparatus; and dummy current output unit connected to the power control apparatus, the dummy current output unit capable of supplying the current sensor with dummy current that is current in a same direction as forward power flow; the control method including: in a state of constant current flowing to a load from the power generation apparatus and the power control apparatus for a predetermined time, a first step of the power control apparatus increasing the dummy current from the dummy current output unit stepwise; and after the first step, a second step of storing, as the threshold, a minimum of the forward power flow when output voltage of the power generation apparatus rises.

A power control system according to one of the embodiments of this disclosure is a power control system including: a power generation apparatus configured to generate, while a current sensor detects forward power flow equal to or greater than a threshold, power corresponding to a value detected by the current sensor; a power control apparatus configured to control distributed power sources including the power generation apparatus; and a dummy current output unit connected to the power control apparatus, the dummy current output unit capable of supplying the current sensor with dummy current that is current in a same direction as forward power flow; such that the power control apparatus includes a controller and a memory; and in a state of constant current flowing to a load from the power generation apparatus and the power control apparatus for a predetermined time, the controller increases the dummy current from the dummy current output unit stepwise and stores, in the memory as the threshold, a minimum of the forward power flow when output voltage of the power generation apparatus rises.

A power control apparatus according to one of the embodiments of this disclosure is configured to control distributed power sources that include a power generation apparatus that generates power while a current sensor detects forward power flow equal to or greater than a threshold; the power control apparatus being connected to a dummy output unit capable of supplying the current sensor with dummy current that is current in a same direction as forward power flow; the power control apparatus including a controller and a memory; such that in a state of constant current flowing to a load from the power generation apparatus and the power control apparatus for a predetermined time, the controller increases the dummy current from the dummy current output unit stepwise and stores, in the memory as the threshold, a minimum of the forward power flow when output voltage of the power generation apparatus rises.

Advantageous Effect

The control method for a power control system, the power control system, and the power control apparatus according to embodiments of this disclosure can manage and control efficient operation of a plurality of distributed power sources without compromising the versatility of the distributed power sources.

BRIEF DESCRIPTION OF THE DRAWINGS

In the accompanying drawings:

FIG. 10 illustrates a correlation table between the current detected by the current sensor and the generated power of the power generation apparatus in the power control system according to Embodiment 2 of this disclosure.

DETAILED DESCRIPTION

Embodiment 1

In addition to power supplied from a grid (commercial power grid), a power control system 100 according to Embodiment 1 of this disclosure is used by being connected to a distributed power source that supplies sellable power and/or a distributed power source that supplies non-sellable power. A distributed power source that supplies sellable power is, for example, a system that supplies power by solar power generation or the like. Conversely, a distributed power source that supplies non-sellable power is, for example, a storage cell system that can charge and discharge power, a fuel-cell system that includes a fuel cell such as a Solid Oxide Fuel Cell (SOFC), a gas power generator system that generates power with gas fuel, or the like. This embodiment illustrates an example of providing a solar cell as a distributed power source that supplies sellable power and providing a storage cell and a power generation apparatus that is a fuel cell or a gas power generator as distributed power sources that supply non-sellable power.

Figure 1:
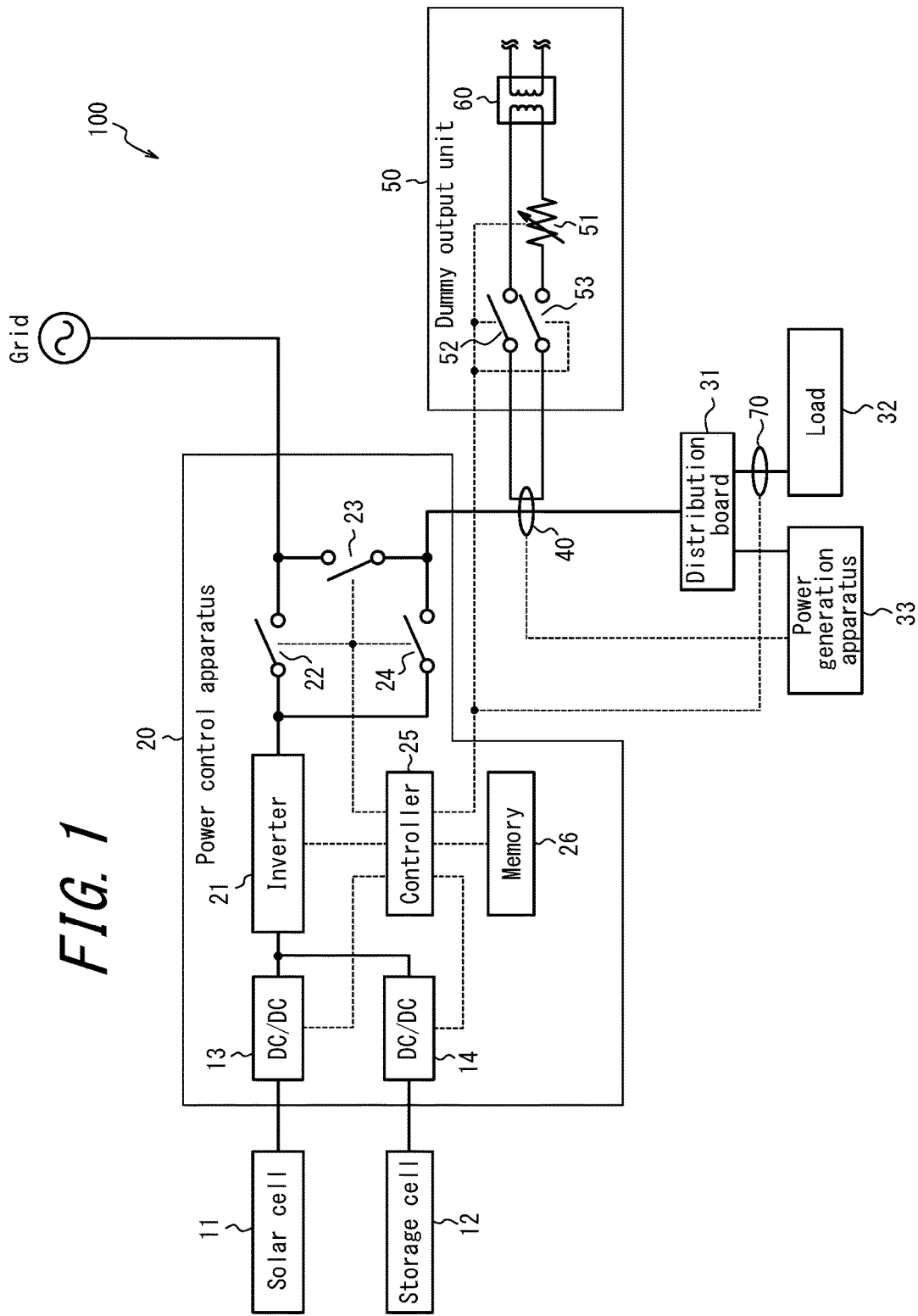
FIG. 1 is a block diagram of a power control system according to one of the disclosed embodiments.

FIG. 1 is a block diagram schematically illustrating the structure of a power control system 100 according to Embodiment 1 of this disclosure. The power control system 100 according to this embodiment includes a power control apparatus 20, a current sensor 40, a dummy output unit 50, and a power generation apparatus 33. A solar cell 11, storage cell 12, distribution board 31, and load 32 that are connected to the power control system 100 and used are also illustrated in FIG. 1. The power generation apparatus 33 is configured by a fuel cell or a gas power generator. The power control system 100 normally performs interconnected operation with the grid and supplies power from the grid and power from the distributed power sources (solar cell 11, storage cell 12, power generation apparatus 33) to the load 32. The power control system 100 performs independent operation when there is no power supply from the grid, such as during a power outage, and supplies power from the distributed power sources (solar cell 11, storage cell 12, power generation apparatus 33) to the loads (load 32, dummy current load 51). When the power control system 100 performs independent operation, the distributed power sources (solar cell 11, storage cell 12, power generation apparatus 33) are in a state of disconnection from the grid, whereas when the power control system 100 performs interconnected operation, the distributed power sources (solar cell 11, storage cell 12, power generation apparatus 33) are in a state of connection to the grid.

In FIG. 1, the solid lines connecting functional blocks indicate wiring through which power flows, and the dashed lines connecting functional blocks indicate the flow of control signals or transmitted information. The communication indicated by the dashed lines may be wired communication or wireless communication. The communication of control signals and information includes various layers, and a variety of methods may be adopted. For example, communication by a short distance communication method such as ZigBee☐ (ZigBee is a registered trademark in Japan, other countries, or both) may be adopted. A variety of transmission media may be used, such as infrared communication, Power Line Communication (PLC), and the like. Any of a variety of communication protocols that only prescribe the logical layer above the lower layers that include the physical layer suitable for this communication, such as ZigBee Smart Energy Profile 2.0 (SEP 2.0), ECHONET Lite☐ (ECHONET Lite is a registered trademark in Japan, other countries, or both), or the like may also be implemented.

The solar cell 11 converts solar energy into DC power. The solar cell 11 is configured so that, for example, power generators that have photoelectric conversion cells are connected in a matrix and output a predetermined short-circuit current (for example, 10 A). The solar cell 11 may be any type of solar cell capable of photoelectric conversion, such as a silicon-based polycrystalline solar cell, a silicon-based monocrystalline solar cell, or a CIGS or other thin-film solar cell.

The storage cell 12 is configured by a storage cell such as a lithium-ion battery or a nickel-hydrogen battery. The storage cell 12 can supply power by discharging the charged power. In addition to charging with power supplied from the grid and the solar cell 11, the storage cell 12 can charge with power supplied from the power generation apparatus 33, as described below.

The power control apparatus 20 converts DC power supplied from the solar cell 11 and the storage cell 12 and AC power supplied from the grid and the power generation apparatus 33 and also controls switching between interconnected operation and independent operation. The power control apparatus 20 includes DC/DC converters 13 and 14, an inverter 21, interconnected operation switches 22 and 23, an independent operation switch 24, a controller 25 that controls the power control apparatus 20 overall, and a memory 26. The power control apparatus 20 is a so-called multi-DC link system that controls power by connecting to the solar cell 11 and the storage cell 12 with the power still as DC power. The interconnected operation switch 23 may be configured to be outside of the power control apparatus 20.

The DC/DC converters 13 and 14 step up or step down the DC power from the solar cell 11 and the storage cell 12 to a predetermined voltage. As the step-up ratio of the DC/DC converters 13 and 14, a pre-set fixed value may be used, or the step-up ratio may be appropriately controlled by the controller 25. The DC/DC converter 13 is a DC/DC converter suitable for solar cell power generation that performs Maximum Power Point Tracking (MMPT) on the generated power from the solar cell 11 and steps up or steps down the voltage to a predetermined voltage. In this embodiment, the DC power from the solar cell 11 and the storage cell 12 is DC linked and therefore needs to be stepped up or stepped down to the same voltage. The DC/DC converter 14 is a bidirectional DC converter that can convert the voltage of power from the grid, the power generation apparatus 33, and the solar cell 11 to charge the storage cell 12.

The inverter 21 is a bidirectional inverter that converts the DC power supplied from the solar cell 11 and the storage cell 12 to AC power and converts the AC power supplied from the grid and the power generation apparatus 33 to DC power. The power control apparatus 20 has the function of detecting the current output by the inverter 21.

The interconnected operation switches 22 and 23 and the independent operation switch 24 are respectively configured by relays, transistors, and the like and are controlled to be on or off. As illustrated, the independent operation switch 24 is disposed between the power generation apparatus 33 and the storage cell 12. The interconnected operation switches 22 and 23 and the independent operation switch 24 are both turned off when being switched between, so as to prevent them from being on simultaneously. In greater detail, when switching from independent operation to interconnected operation, the interconnected operation switches 22 and 23 are turned on after the independent operation switch 24 is turned off. When switching from interconnected operation to independent operation, the independent operation switch 24 is turned on after the interconnected operation switches 22 and 23 are turned off. The aforementioned control of the interconnected operation switches 22 and 23 and the independent operation switch 24 may, for example, be implemented via software by the controller 25. As an exception to the aforementioned control, however, when the power supply from the distributed power sources is off, power is supplied only from the grid to the distribution board 31 by turning just the interconnected operation switch 23 on and turning the interconnected operation switch 22 and the independent operation switch 24 both off.

The controller 25 may, for example, be configured by a microcomputer, and based on states such as a rise in the grid voltage or a power outage, the controller 25 controls operations of components such as the inverter 21, the interconnected operation switches 22 and 23, and the independent operation switch 24. During interconnected operation, the controller 25 turns the interconnected operation switches 22 and 23 on and turns the independent operation switch 24 off. During independent operation, the controller 25 turns the interconnected operation switches 22 and 23 off and turns the independent operation switch 24 on.

The memory 26 has the function of storing various programs executed by the controller 25, along with the current detection results and the like during various processing, as described below.

The distribution board 31 divides power supplied by the grid during interconnected operation into a plurality of branches for distribution to the load 32. The distribution board 31 also divides power supplied from the plurality of distributed power sources (solar cell 11, storage cell 12, power generation apparatus 33) into a plurality of branches for distribution to the load 32. Here, the load 32 is a power load that consumes power. Examples include a variety of household electrical appliances such as an air conditioner, microwave oven, and television; machinery and lighting facilities, such as air conditioning equipment and lighting equipment, that are used in commercial and industrial facilities; and the like.

The power generation apparatus 33 is configured by a fuel cell or a gas power generator. The fuel cell is provided with a cell that generates DC power by chemically reacting hydrogen with oxygen in the air, an inverter that converts the generated DC power to 100 V or 200 V AC power, and other auxiliary machines. The fuel cell serving as the power generation apparatus 33 is a system that can supply AC power to the load 32 without passing through the power control apparatus 20 and may be a versatile system not necessary designed under the assumption of connecting to the power control apparatus 20. The gas power generator generates power with a gas engine that uses a predetermined gas or the like as fuel.

The power generation apparatus 33 generates power while the corresponding current sensor 40 detects forward power flow (current in the direction of buying power), and when generating power, performs either load following operation to follow the power consumption of the load 32 or rated operation at a predetermined rated power. The following range during load following operation may, for example, be 200 W to 700 W, and the rated power during rated operation may, for example, be 700 W. The power generation apparatus 33 performs load following operation to follow the power consumption of the load 32 during interconnected operation and performs either load following operation or fixed operation at a fixed power during independent operation.

The current sensor 40 detects current flowing between the grid and the power generation apparatus 33. In Japan, power generated by the power generation apparatus 33 is regulated as non-sellable power, and therefore when the current sensor 40 detects reverse power flow towards the grid (current in the direction of selling power), the power generation apparatus 33 suspends power generation. While the current sensor 40 detects forward power flow of a predetermined threshold or greater, the power generation apparatus 33 generates power by load following operation or fixed operation, since its own power can be supplied to the load 32. The current sensor 40 is disposed between the independent operation switch 24 and the distribution board 31 in FIG. 1 so as to be able to detect current flowing between the grid and the power generation apparatus 33 and current flowing between the power generation apparatus 33 and the storage cell 12.

The current sensor 40 of this embodiment has a ring shape, with the power line from the grid and the distributed power sources passing through the center, and a dummy output line from the dummy output unit 50 being wound around the current sensor 40 for a predetermined number of turns. As the dummy power line is wound around the current sensor 40 for more turns, then with a minute current, a larger dummy current in the forward power flow direction can be detected.

A second current sensor 70 is a sensor provided to detect current flowing from the power control apparatus 20 or the power generation apparatus 33 to the load 32 and is disposed between the distribution board 31 and the load 32 in this embodiment.

The power control system 100 in this embodiment performs control so that while the power generation apparatus 33 and the storage cell 12 are disconnected from the grid, current in the same direction as a dummy forward power flow (dummy current) flows into the current sensor 40 via the dummy output unit 50. As a result, the power generation apparatus 33 can be caused to perform rated operation, and the power generated by the power generation apparatus 33 can be stored in the storage cell 12. The following provides details on power storage by dummy current through the dummy output unit 50.

Figure 2:
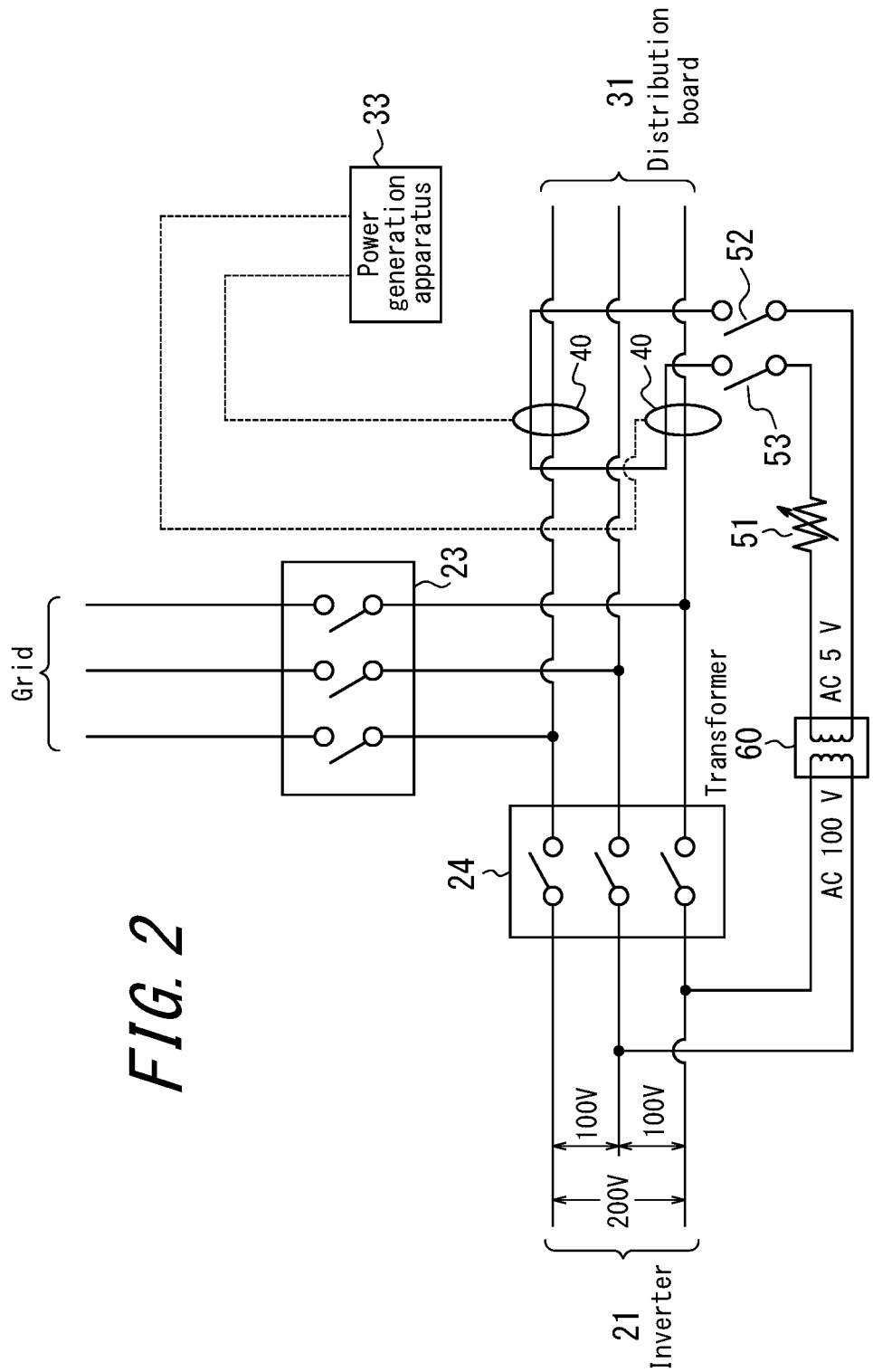
FIG. 2 illustrates wiring related to a dummy output unit in a power control system according to one of the disclosed embodiments.

The dummy output unit 50 can supply dummy current, which is current in the same direction as forward power flow, to the current sensor 40. The dummy output unit 50 is a system that can receive power supplied from the power control apparatus 20 or the power generation apparatus 33 and includes a dummy current load 51, a synchronization switch 52, a dummy current control switch 53, and a transformer 60. FIG. 2 illustrates wiring related to the dummy output unit 50. In FIG. 2, the grid is a 200 V single-phase three-wire system. In this case, one of the voltage wires and the neutral wire are connected to the dummy output unit 50 via the transformer 60. As illustrated, the connecting wires of the dummy output unit 50 are wired so as to pass through the current sensor 40 disposed on each of the two voltage wires. The dummy output unit 50 may be configured integrally with the power control apparatus 20 or independent from the power control apparatus 20. In the case in FIG. 2, one of the voltage wires and the neutral wire are connected to the transformer 60, but a configuration may be adopted to connect both voltage wires.

The dummy current load 51 is a load provided for current regulation within the dummy output unit 50. In this embodiment, for example a variable resistance device, the resistance of which can be controlled by the controller 25, may be used as the dummy current load 51. A load external to the dummy output unit 50 may also be used as the dummy current load 51. The synchronization switch 52 is for providing a portion of the power supplied to the dummy output unit 50 from the power control apparatus 20 or the power generation apparatus 33 to the current sensor 40 as dummy current in the same direction as forward power flow. The dummy current control switch 53 is for preventing unnecessary power generation as a result of dummy current. The synchronization switch 52 and the dummy current control switch 53 are each configured by independent relays, transistors, or the like and are controlled independently to be on or off by the controller 25 of the power control apparatus 20.

As illustrated in FIG. 1 and FIG. 2, the dummy current load 51 and the dummy current control switch 53 are connected in series, and when both the synchronization switch 52 and the dummy current control switch 53 are on, dummy current flows to the dummy current load 51.

The transformer 60 has the role of stepping down the power from the power control apparatus 20 or the power generation apparatus 33. In this embodiment, the turn ratio of the transformer 60 is 20, and AC 100 V power from the power control apparatus 20 or the power generation apparatus 33 is stepped down to AC 5 V power and then supplied to the dummy current load 51. In this way, by supplying power to the dummy current load 51 after the power is stepped down in the transformer 60, the power consumption in the dummy current load 51 can be reduced, thereby allowing a reduction in size of the dummy current load 51.

Since the voltage on the switches 52 and 53 can be kept low, less expensive products can be used for the switches 52 and 53. Furthermore, for the same power consumption by the dummy current load 51, a larger dummy current can be caused to flow.

The synchronization switch 52 is controlled to be on or off in synchronization with the independent operation switch 24 of the power control apparatus 20. In other words, like the independent operation switch 24, the synchronization switch 52 is off during interconnected operation and is on during independent operation. In greater detail, the synchronization switch 52 is a switch that synchronizes the switching of connection/disconnection to/from the grid with the switching timing and is controlled to pass the dummy current at the time of disconnection and not to pass the dummy current at the time of connection. Synchronous control of the independent operation switch 24 and the synchronization switch 52 is implemented via hardware by branching the wiring of the control signal for the independent operation switch 24 to the synchronization switch 52. Synchronous control of the independent operation switch 24 and the synchronization switch 52 may also be implemented via software by the controller 25.

The dummy current control switch 53 turns off when charging of the storage cell 12 is complete and turns on when charging is incomplete. Charging of the storage cell 12 being complete refers to the case of a predetermined level of power or greater being charged in the storage cell 12. The controller 25 may be configured to determine whether charging is complete by communicating with the storage cell 12. When the charging of the storage cell 12 is completed during independent operation and the dummy current control switch 53 turns off, the dummy current stops flowing to the current sensor 40, and therefore unnecessary power generation by the power generation apparatus 33 can be suspended. The dummy current control switch 53 is also controlled to be off upon switching to the below-described dummy current determination mode.

Setting of the dummy current in this embodiment is now described. The power generation apparatus 33 in the power control system 100 of this embodiment can, for example, have a fixed power of 700 W. In FIG. 1 and FIG. 2, however, upon the power generation apparatus 33 outputting a power of 700 W, the current sensor 40 detects current in the reverse power flow direction corresponding to output power of 700 W, and the power generation apparatus 33 suspends its own power generation.

Therefore, in this embodiment, power is supplied to the dummy output unit 50 from the power control apparatus 20 or the power generation apparatus 33, and dummy current is passed in order to cancel out the current in the reverse power flow direction detected by the current sensor 40. For example, in the case of the power generation apparatus 33 outputting 700 W of power in the reverse power flow direction, the dummy output unit 50 needs to be configured so that a dummy current equivalent to output power of 750 W flows in order for the current detected by the current sensor 40 to become 50 W of forward power flow.

Here, the case of generating a dummy current equivalent to output power of 750 W in the current sensor 40 is considered. If the output voltage of the distributed power sources is AC 200 V, and the number of turns of the dummy output wire wound around the current sensor 40 is five, then the dummy current $I1$ to be generated by the dummy output unit 50 is calculated as follows.

$$I1 = 750/200/5 = 0.75 \text{ [A]} \qquad \text{Formula (1)}$$

Next, the method of determining the resistance R1 of the dummy current load 51 in order to generate the aforementioned I1 is described. As illustrated in FIG. 2, one of the voltage wires and the neutral wire are connected to the dummy output unit 50. Power at AC 100 V voltage is stepped down to AC 5 V in the transformer 60 and then supplied to the dummy output unit 50. Accordingly, the resistance R1 for generating the aforementioned I1 is calculated as follows.

$$R1=5/0.75=6.7 \ [\Omega] \quad \text{Formula (2)}$$

The dummy current I1 and resistance R1 sought by the aforementioned calculations are merely one embodiment. A variety of parameters can be chosen depending on the number of turns of the dummy output wire, the dummy current to be supplied to the current sensor 40 (and the power output equivalent thereto), and the like.

With reference to the drawings, the following is a detailed example of control in the power control system 100 according to this embodiment.

Control During Interconnected Operation

Figure 3:
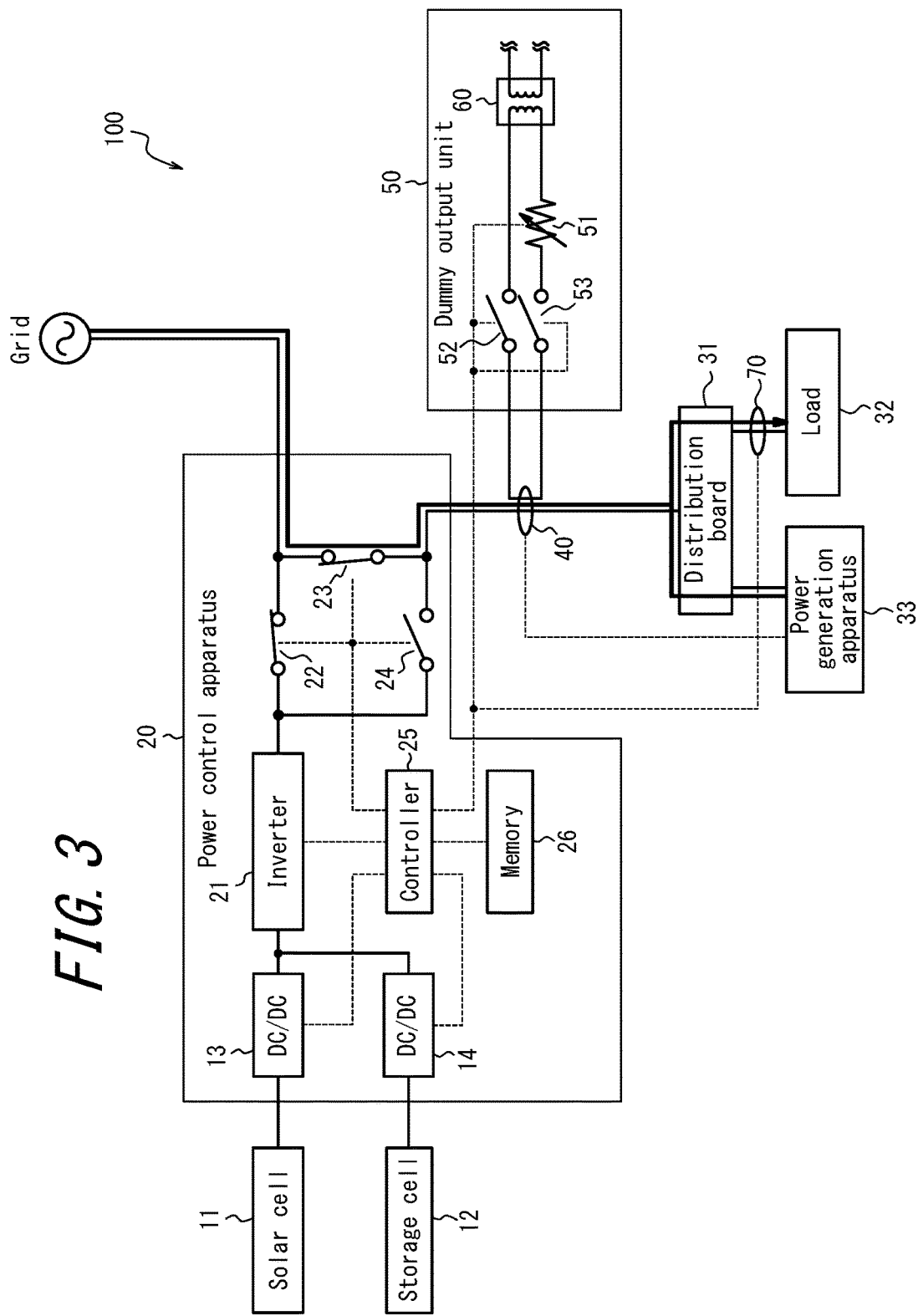
FIG. 3 illustrates an example of control during interconnected operation of a power control system according to one of the disclosed embodiments.

FIG. 3 illustrates an example of control of the power control system 100 during interconnected operation. In this case, the switches in the power control apparatus 20 are controlled as follows: the interconnected operation switches 22 and 23 are on, and the independent operation switch 24 is off. Also, the switches in the dummy output unit 50 are controlled as follows: the synchronization switch 52 is off, and the dummy current control switch 53 is either on or off in accordance with the charging amount of the storage cell 12.

During interconnected operation, as indicated by the bold lines, AC 100 V (or 200 V) power is supplied by the grid and fed to the load 32. When charging by the storage cell 12 is not complete, the power control apparatus 20 converts the AC power from the grid to DC power and charges the storage cell 12. The power control apparatus 20 can convert the power generated by the solar cell 11 to DC power for reverse power flow to the grid and can sell surplus power. The power control apparatus 20 is configured to allow output of power from the grid and power of the distributed power sources (solar cell 11, storage cell 12) to the dummy output unit 50, but since the synchronization switch 52 is off during interconnected operation, dummy power is not supplied to the current sensor 40. Since forward power flow from the grid (current in the direction of buying power) flows to the current sensor 40, the power generation apparatus 33 performs load following operation and can supply power to the load 32 via the distribution board 31.

Control During Independent Operation

Figure 4:
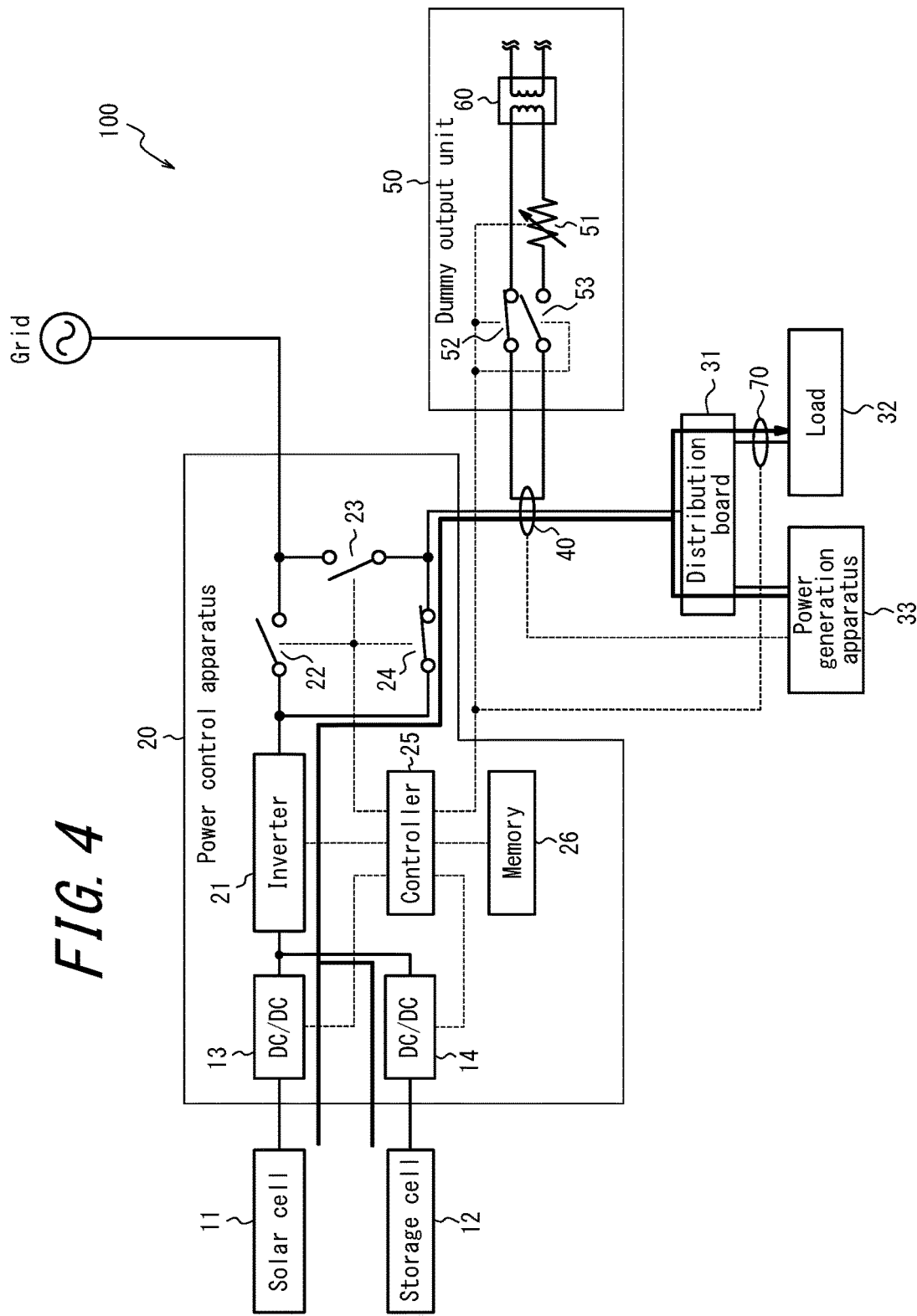
FIG. 4 illustrates an example of control during independent operation (when discharging) of a power control system according to one of the disclosed embodiments.

Next, an example of control of the power control system 100 during independent operation is described with reference to FIG. 4. In this case, the switches in the power control apparatus 20 are controlled as follows: the interconnected operation switches 22 and 23 are off, and the independent operation switch 24 is on. Also, the switches in the dummy output unit 50 are controlled as follows: the synchronization switch 52 is on, and the dummy current control switch 53 is off. In FIG. 4, charging of the storage cell 12 is assumed to be complete.

The bold lines in FIG. 4 are an example of power supply by the distributed power sources during independent operation. In this example, via the power control apparatus 20, the power of the distributed power sources (solar cell 11, storage cell 12) is output to the load 32 through the independent operation switch 24. Since the current sensor 40 detects current from the distributed power source in the forward power flow direction, the power generation apparatus 33 can perform load following operation.

Next, operations in dummy current determination mode during independent operation are described. First, the dummy current for causing current equivalent to 50 W in the forward power flow direction to flow in the current sensor 40 is described. The power generation apparatus 33 begins to generate power upon the current sensor 40 detecting forward power flow equivalent to a certain number of watts, but this number depends on the design and specification of the power generation apparatus 33. Therefore, in this embodiment, the method for determining the dummy current at which the power generation apparatus 33 actually starts to generate power is to measure the dummy current.

Figure 5:
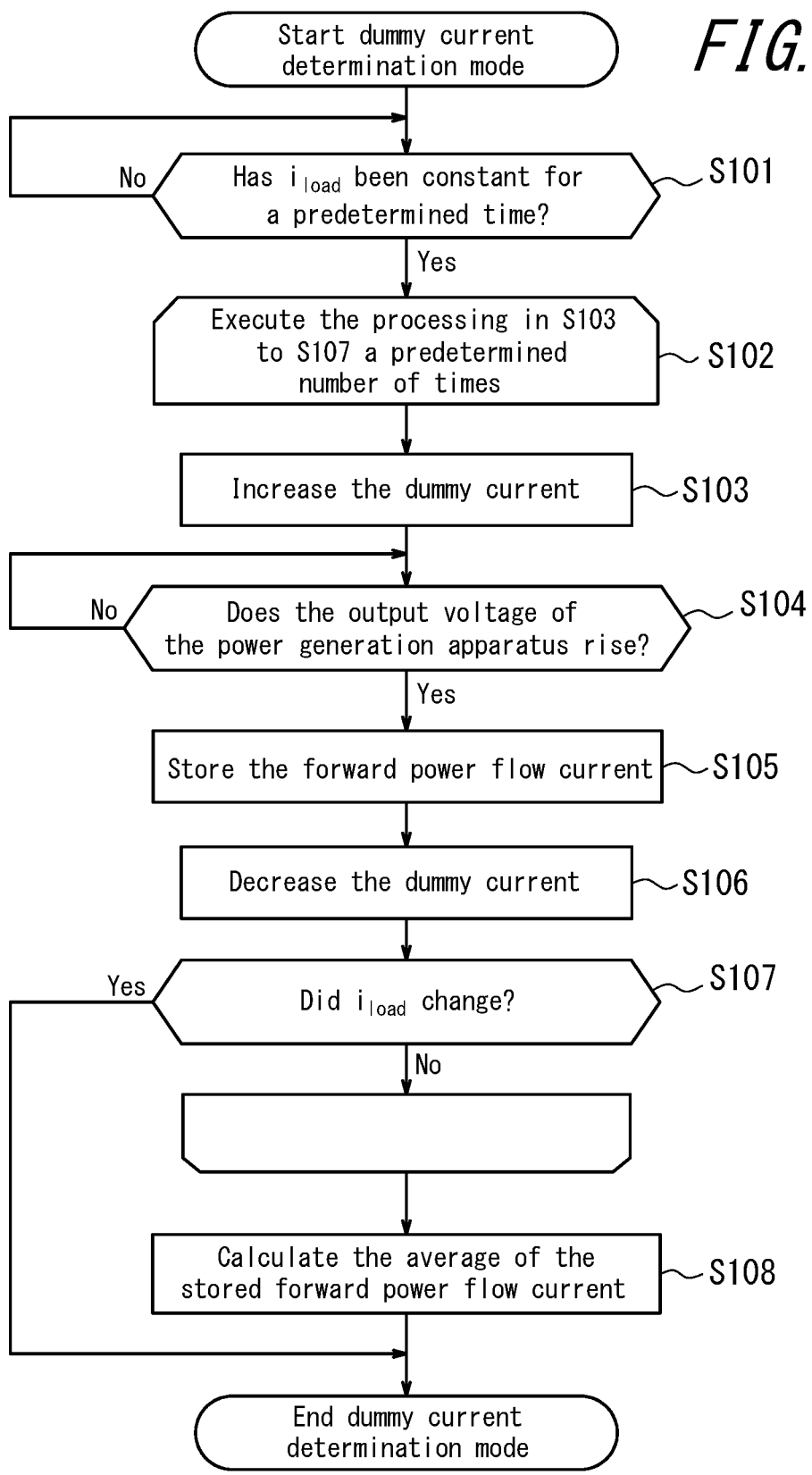
FIG. 5 is a control flowchart for the dummy current determination mode of the power control system according to Embodiment 1 of this disclosure.

FIG. 5 is a control flowchart in the dummy current determination mode during independent operation.

Figure 6A:
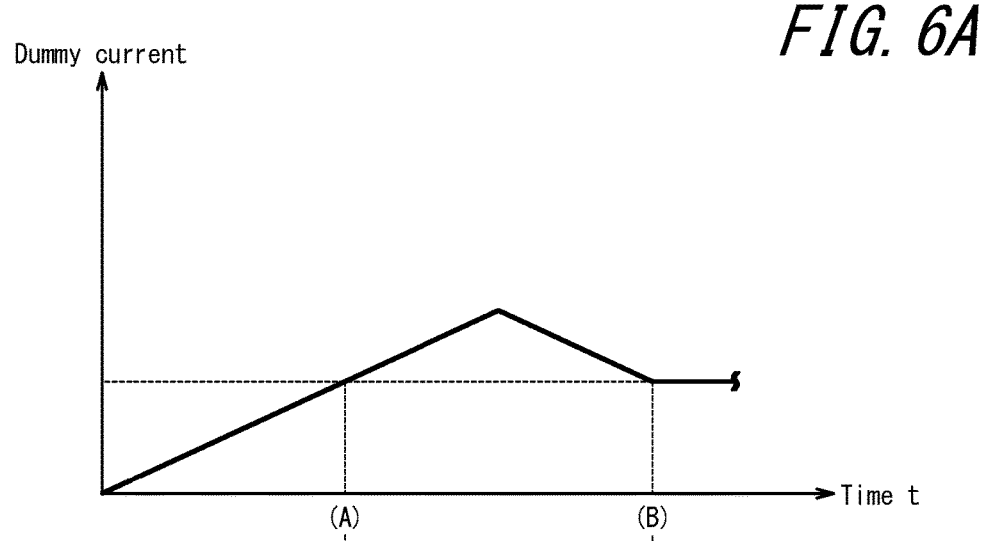
FIGS. 6A and 6B illustrate the change over time in the output voltage of the power generation apparatus when the dummy current is changed in the power control system according to Embodiment 1 of this disclosure.
Figure 6B:
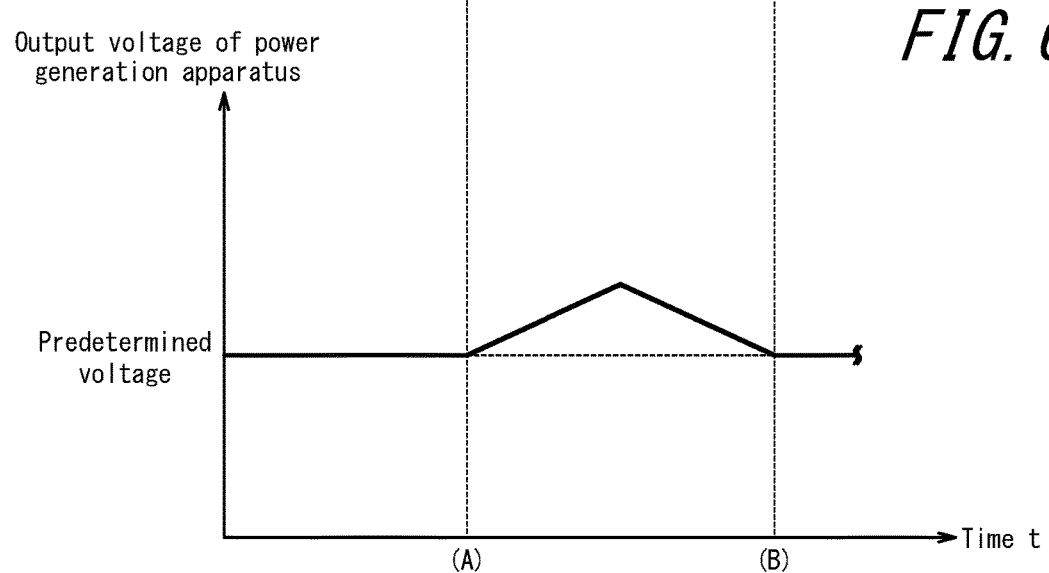

During independent operation as illustrated in FIG. 4, the controller 25 transitions to dummy current determination mode to determine the dummy current. First, the controller 25 monitors output of the second current sensor 70 and determines whether the current iload flowing to the load 32 has been constant for a predetermined time (step S101). When the current iload has been constant for a predetermined time, the controller 25 then turns the dummy current control switch 53 on and gradually reduces the dummy current load 51, thereby increasing the dummy current (step S103). The dummy current waveform at this time is, for example, as in FIG. 6A. The controller 25 monitors the output voltage of the power generation apparatus 33 while increasing the dummy current and confirms whether there is a rise in the output voltage (step S104). The output power of the power generation apparatus 33 increases along with an increase in the dummy current, i.e. an increase in the detected current in the forward power flow direction, and upon exceeding the power consumed by the load 32, the output voltage rises, as illustrated in FIG. 6B (time (A)). Upon detecting the rise in output voltage of the power generation apparatus 33, the controller 25 calculates the value corresponding to the detected current in the forward power flow direction detected by the current sensor 40 at that time based on the output current of the power control apparatus 20 and the dummy current and stores the result in the memory 26 (step S105). The detected current in this case is the minimum detected current for which the output voltage of the power generation apparatus 33 rises. The power control apparatus 20 cannot directly read the current detected by the current sensor 40, and therefore by adding the dummy current to the detected current of the power control apparatus 20, a value corresponding to the current detected by the current sensor 40 is calculated. The controller 25 subsequently reduces the dummy current gradually (step S106) and returns the output voltage of the power generation apparatus 33 to a predetermined voltage (time (B)). The controller 25 confirms whether the current iload has changed (step S107) and terminates the dummy current determination mode if the current iload has changed. The controller 25 executes the processing from steps S103 through S107 a predetermined number of times (step S102). The predetermined number of times may, for example, be 10.

After executing the processing in step S102 a predetermined number of times, the controller 25 calculates the average of the current in the forward power flow direction stored a predetermined number of times in the memory 26 (step S108) and stores the result in the memory 26. The controller 25 then terminates the dummy current determination mode and transitions to regular operation mode. The controller 25 controls the dummy current so that the current in the forward power flow direction calculated in step S108 flows into the current sensor 40. The controller 25 may further add an amount of current determined in advance to the dummy current so that when the power generation apparatus 33 starts to generate power, the power generation apparatus 33 generates a predetermined output power.

Next, the computational procedure for the current in the forward power flow direction calculated in step S108 to flow is described.

Here, the case of the power generation apparatus 33 being caused to generate 400 W of power, of which 200 W are consumed by the load 32, is described. Since the output voltage of the distributed power source is AC 200 V, the reverse power flow current Ir flowing into the current sensor 40 because of power generation by the power generation apparatus 33 is calculated with mathematical formula (3) below.

$$Ir=(400-200)/200=1.0 \text{ [A]} \quad \text{Formula (3)}$$

Supposing that the forward power flow current determined in step S108 is 0.15 [A], the dummy current Ia that the current sensor 40 should be caused to detect is calculated by mathematical formula (4) below.

$$Ia=1.0+0.15=1.15 \text{ [A]} \quad \text{Formula (4)}$$

If the number of turns of the dummy output wire wound around the current sensor 40 is five, then the current Ia1 to be generated by the dummy output unit 50 is calculated by mathematical formula (5) below.

$$Ia1=1.15/5=0.23 \text{ [A]} \quad \text{Formula (5)}$$

As described above, since the voltage supplied by the dummy output unit 50 is stepped down to 5 V, the value Ra1 of the dummy current load 51 that should be set in order to generate the aforementioned current Ia1 is calculated by mathematical formula (6) below.

$$Ra1=5/0.23=22 \text{ [}\Omega\text{]} \quad \text{Formula (6)}$$

Accordingly, after setting the resistance Ra1 of the dummy current load 51 to be the aforementioned value, the controller 25 preferably turns the dummy current control switch 53 on, supplies the dummy current, and causes charging of the storage cell 12 to start. As a result, the current sensor 40 detects the forward power flow current determined in step S108, and therefore the power generation apparatus 33 can supply power to the load 32 while charging the storage cell 12.

Figure 7:
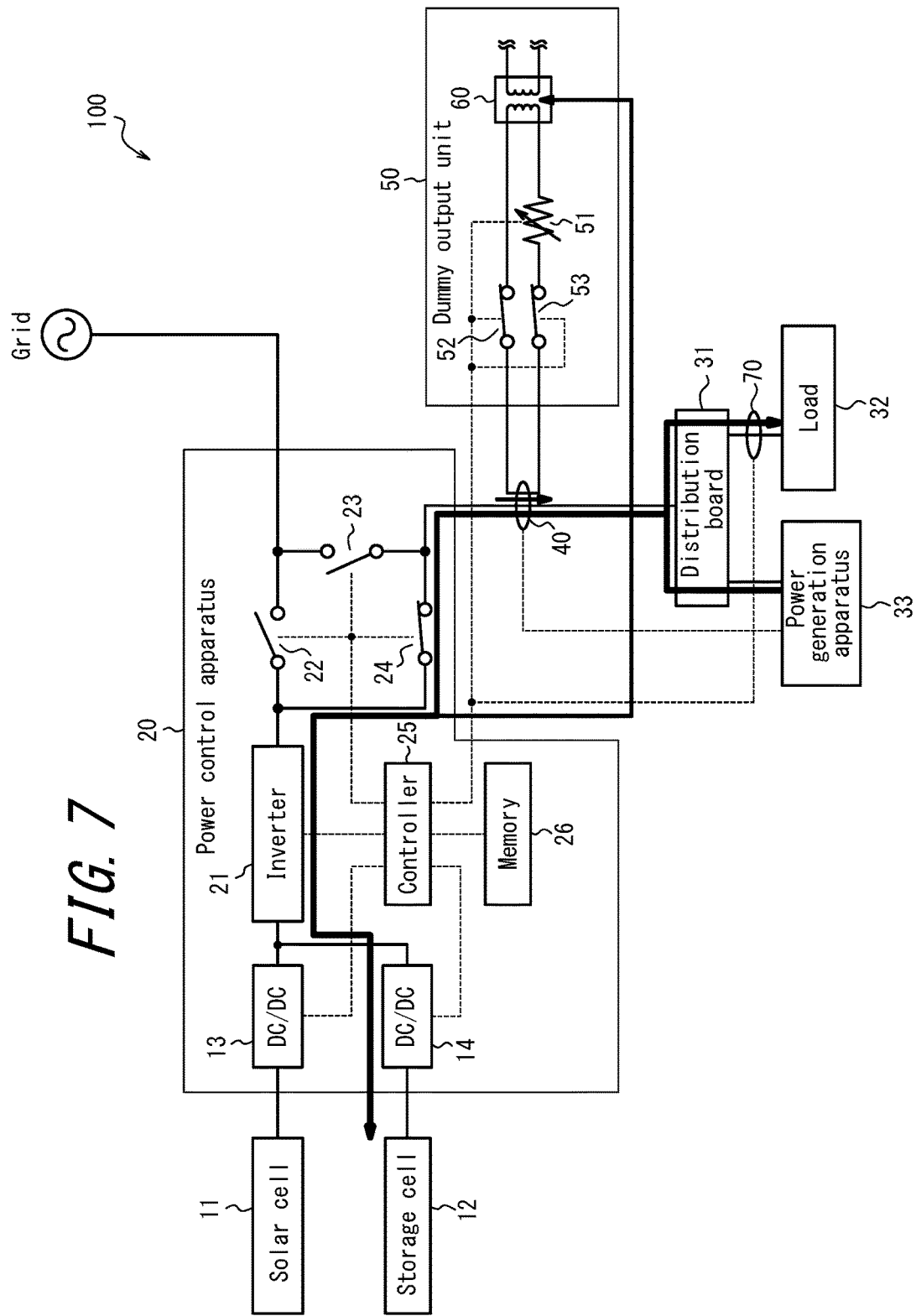
FIG. 7 illustrates an example of control during independent operation (when charging) of a power control system according to one of the disclosed embodiments.

FIG. 7 illustrates an example of control for charging the storage cell 12 with a portion of the power generated by the power generation apparatus 33 during independent operation. As illustrated in FIG. 7, when the power generation apparatus 33 generates power during independent operation, power is supplied to the dummy output unit 50 by the power control apparatus 20. The power supplied to the dummy output unit 50 flows to the dummy output wire via the transformer 60 and is detected by the current sensor 40 as dummy current. At this time, the dummy output unit 50 operates so that the current sensor 40 detects forward power flow (current in the direction of buying power), and therefore the power generation apparatus 33 generates power. The distribution board 31 supplies the power generated by the power generation apparatus 33 to the load 32 and supplies the surplus power that exceeds the power consumption of the load 32 to the power control apparatus 20. In the power control apparatus 20, the surplus power passes through the independent operation switch 24 and is converted to DC power by the inverter 21. The surplus power is then fed to the storage cell 12.

After the power generation apparatus 33 starts to generate power as well, the controller 25 preferably continues to monitor the current corresponding to the current detected by the current sensor 40 and adjusts the dummy current load 51 so that the forward power flow current is always detected. The reason is that when there is variation in the power consumption of the load 32 or the generated power from the power generation apparatus 33, the power generation apparatus 33 suspends power generation upon the current sensor 40 detecting reverse power flow.

In this embodiment, in addition to being a variety of devices used by the user, the load 32 may be a dummy load that is a known load in order to determine the dummy current.

In this embodiment, the means for detecting current flowing in the load 32 is not limited to the second current sensor 70 alone, and a component such as a distribution board with an embedded current sensor may be used.

In this embodiment, the dummy current is adjusted by adjusting the resistance of the dummy current load 51, but this configuration is not limiting. The resistance of the dummy current load 51 may be fixed, and the voltage supplied to the dummy output unit 50 may be adjusted.

In this embodiment, power is supplied to the dummy output unit 50 from the power control apparatus 20, but this configuration is not limiting. Power may instead be supplied to the dummy output unit 50 from a different power source that is synchronized with the power control apparatus 20.

In this embodiment, the current equivalent to the current in the forward power flow direction detected by the current sensor 40 is stored in step S105, but this configuration is not limiting. The dummy current each time the output voltage of the power generation apparatus 33 rises may be stored, and using the average of these values, the dummy current during regular operation may be determined. The reason is that when the power generated by the power generation apparatus 33 and the power consumption of the load 32 are constant, the dummy current and the current detected by the current sensor 40 are in one-to-one correspondence.

In this way, according to this embodiment, the power control system 100 includes the dummy output unit 50 that can supply power from the power generation apparatus 33 or the other distributed power sources (solar cell 11, storage cell 12) while the power generation apparatus 33 and the other distributed power sources are disconnected from the grid, and based on the output from the dummy output unit 50, dummy current that is current in the same direction as forward power flow can be supplied to the current sensor 40. As a result, efficient operation of a plurality of distributed power sources can be controlled and managed without compromising the versatility of the distributed power sources. In greater detail, during independent operation, the power generation apparatus 33 can intentionally be caused to generate power by passing a dummy current to the current sensor 40. Furthermore, power generation by the power generation apparatus 33 is controlled using dummy current to the current sensor 40, offering the advantages that no special changes need to be made to the power generation apparatus 33 itself, and that a general-purpose fuel cell system and gas power generation system can be adopted.

According to this embodiment, the synchronization switch 52 is a switch that synchronizes the switching of connection/disconnection to/from the grid with the switching timing, passes the dummy current at the time of disconnection, and does not pass the dummy current at the time of connection. As a result, dummy current flows to the current sensor 40 at the time of independent operation, during disconnection from the grid. Dummy current does not flow to the current sensor 40 at the time of interconnected operation, during connection to the grid, and hence reverse power flow from the power generation apparatus 33 does not occur by mistake.

According to this embodiment, the independent operation switch 24, which is off during interconnected operation and is on during independent operation by the distributed power sources, is disposed between the power generation apparatus 33 and the other distributed power sources (solar cell 11, storage cell 12). As a result, during independent operation, the power generated by the power generation apparatus 33 can be supplied to the other distributed power sources through the independent operation switch 24.

According to this embodiment, the storage cell 12 can charge with power from the power generation apparatus 33 when the independent operation switch 24 is on. As a result, during independent operation, the storage cell 12 can be charged with power that is generated by the power generation apparatus 33 and that, for example, is surplus power exceeding the power consumption of the load 32.

In this embodiment, the dummy current determination mode is provided, the forward power flow current necessary for reliably causing the power generation apparatus 33 to start power generation is determined by measurement, and the dummy current is adjusted to become the determined value. According to this configuration, the dummy current can be kept down to the level necessary for the power generation apparatus 33 to maintain the power generation state, thus allowing suppression of unnecessary power consumption in the dummy current load 51.

In this embodiment, the necessary forward power flow current is measured multiple times, and the average thereof is adopted. According to this configuration, the dummy current can be further suppressed, thus allowing further suppression of unnecessary power consumption in the dummy current load 51.

Embodiment 2

A power control system according to Embodiment 2 of this disclosure has a similar structure to that of Embodiment 1, except that the control flow in the dummy current determination mode during independent operation differs. Accordingly, the following describes the differences from Embodiment 1.

Figure 8:
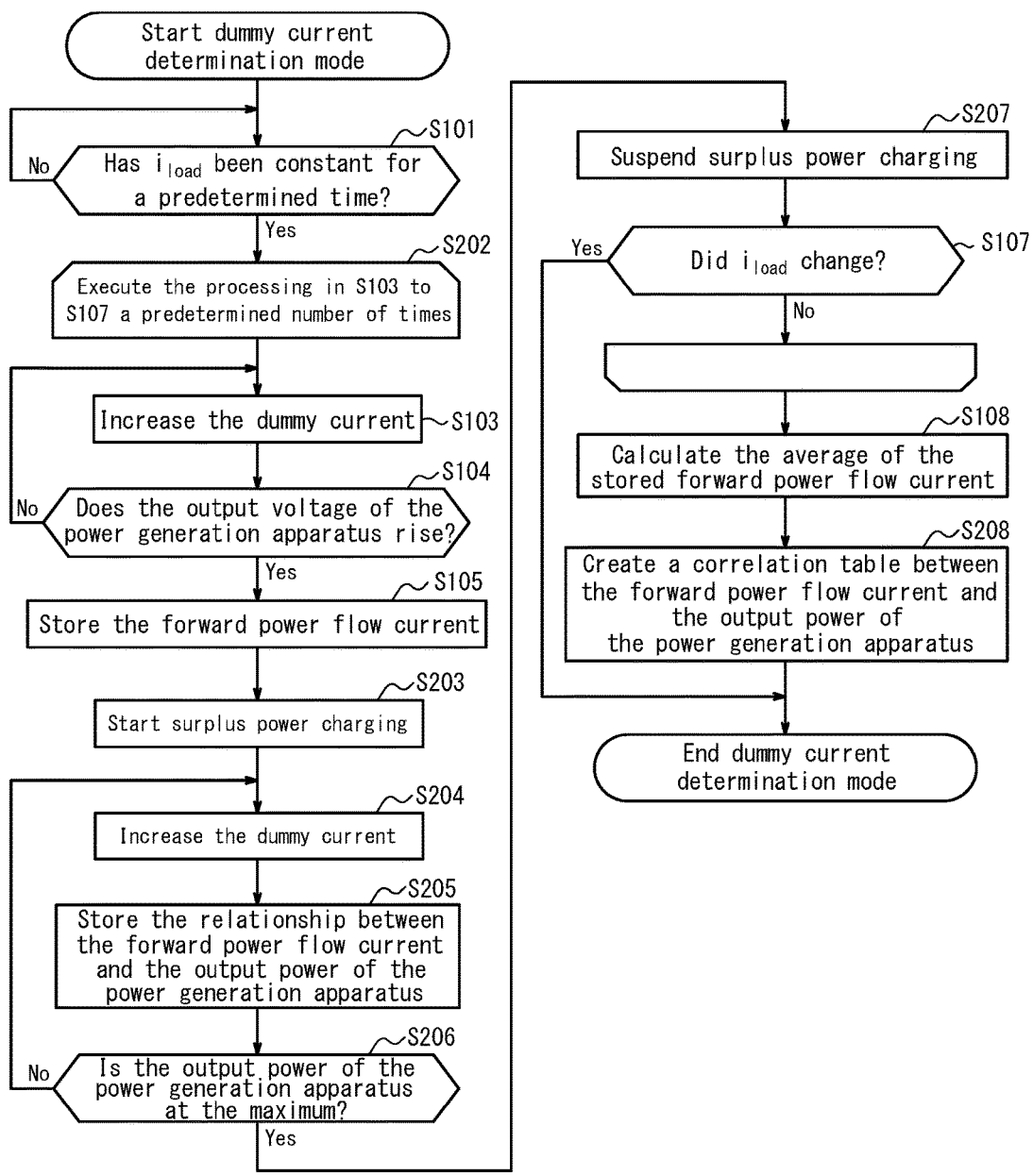
FIG. 8 is a control flowchart for the dummy current determination mode of the power control system according to Embodiment 2 of this disclosure.

FIG. 8 is a control flowchart in the dummy current determination mode during independent operation of the power control system according to this embodiment.

Figure 9A:
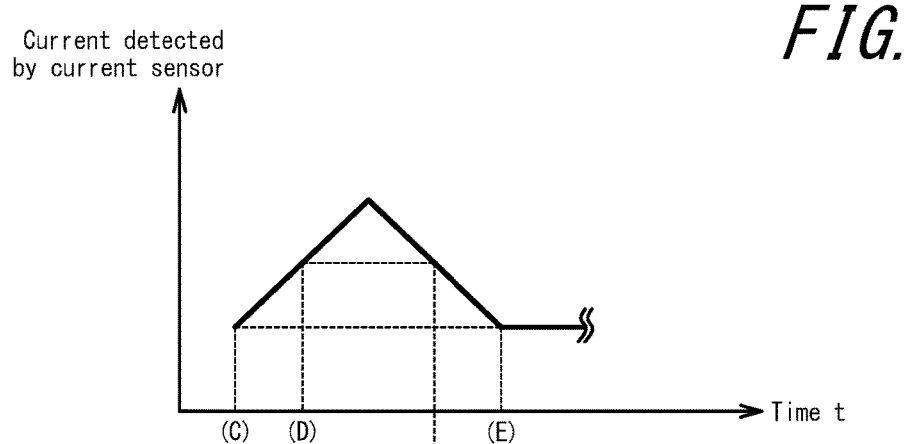
FIGS. 9A, 9B, and 9C illustrate the change over time in the output voltage of the power generation apparatus and the charging power to the storage cell when the dummy current is changed in the power control system according to Embodiment 2 of this disclosure.
Figure 9B:
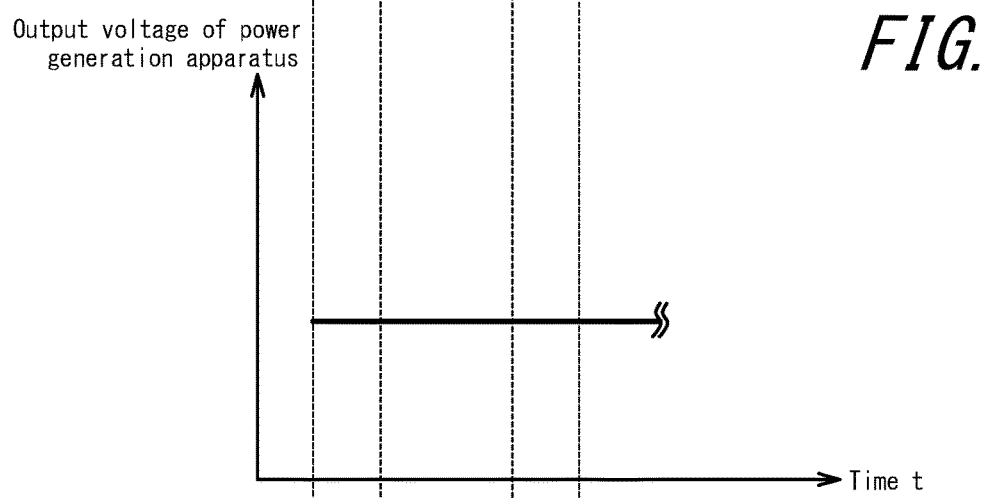
Figure 9C:
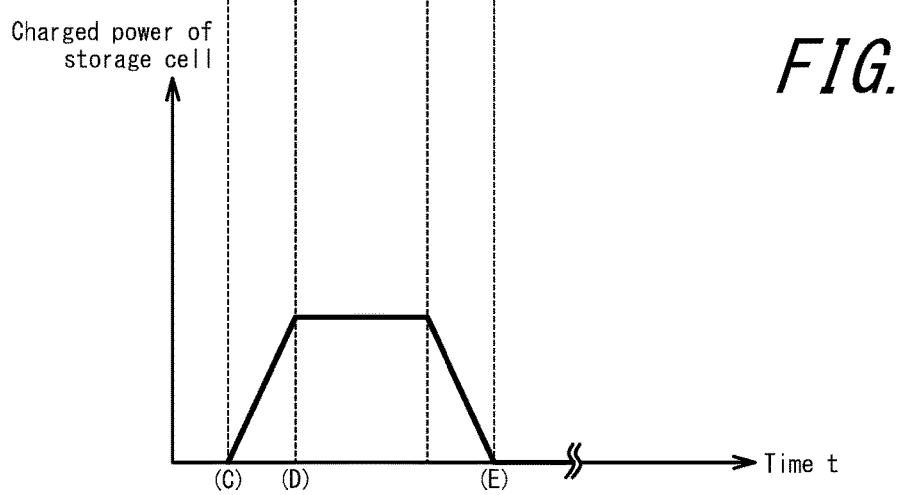

First, the controller 25 transitions to dummy current determination mode to determine the dummy current. The controller 25 monitors output of the second current sensor 70 and determines whether the current iload flowing to the load 32 has been constant for a predetermined time (step S101). When the current iload has been constant for a predetermined time, the controller 25 then gradually increases the dummy current (step S103). The controller 25 monitors the output voltage of the power generation apparatus 33 while increasing the dummy current and confirms whether there is a rise in the output voltage (step S104). The output power of the power generation apparatus 33 increases along with an increase in the dummy current, i.e. an increase in the detected current in the forward power flow direction, and upon exceeding the power consumed by the load 32, the output voltage rises. Upon detecting the rise in output voltage of the power generation apparatus 33, the controller 25 calculates the value corresponding to the detected current in the forward power flow direction detected by the current sensor 40 at that time and stores the result in the memory 26 (step S105). Subsequently, the controller 25 starts to charge the storage cell 12 with surplus power that, among the power output from the power generation apparatus 33, is not consumed by the load 32 (step S203). FIG. 9A illustrates the current detected by the current sensor 40, FIG. 9B illustrates the output voltage of the power generation apparatus 33, and FIG. 9C illustrates the charging power of the storage cell 12 after the start of charging of the storage cell 12. After the storage cell 12 starts to charge, the controller 25 further increases the dummy current as illustrated in FIG. 9A to cause the forward power flow current to rise (time (C)) (step S204). At this time, the charging power to the storage cell 12 illustrated in FIG. 9C (the surplus power in the power generation apparatus 33) also starts to rise. In the memory 26, the controller 25 stores the relationship between the value equivalent to the current detected in the forward direction in the current sensor 40 and the power generated by the power generation apparatus 33 for each dummy current (step S205). Once the output power in the power generation apparatus 33 reaches a maximum and the charging power to the storage cell 12 stops increasing (time (D)) (step S206), the controller 25 decreases the dummy current and suspends charging with the surplus power (time (E)) (step S207). The controller 25 confirms whether the current iload has changed (step S107) and terminates the dummy current determination mode if the current iload has changed. The controller 25 executes the processing from steps S103 through S107 in FIG. 8 a predetermined number of times (step S202). The predetermined number of times may, for example, be 10.

After executing the processing in step S202 a predetermined number of times, the controller 25 calculates the average of the values equivalent to the current detected in the forward power flow direction that was stored a predetermined number of times in the memory 26 (step S108). Furthermore, the controller 25 generates a correlation table between the values equivalent to the current detected in the forward direction stored in the memory 26 and the power generated by the power generation apparatus 33 (step S208) and terminates the dummy current determination mode. At this time, for example a correlation table such as the one in FIG. 10 is stored in the memory 26. During subsequent normal operations, the controller 25 controls the dummy current so that the current sensor 40 detects a value equivalent to the forward power flow current calculated in step S108. When charging the storage cell 12 with surplus power as in the control example in FIG. 7, the controller 25 determines the forward direction current from the correlation table created in step S208, the power consumption of the load 32, and the charging power to the storage cell 12 and controls the dummy current so that the current sensor 40 detects the determined forward direction current.

In this embodiment, during the dummy current determination mode, a correlation table between the forward direction current detected in the current sensor 40 and the power generated by the power generation apparatus 33 is thus acquired. By controlling the dummy current using this correlation table, the power generated by the power generation apparatus 33 can be adjusted to any value.

Although exemplary embodiments have been described with reference to the accompanying drawings, it is to be noted that various changes and modifications will be apparent to those skilled in the art based on this disclosure. Therefore, such changes and modifications are to be understood as included within the scope of this disclosure. For example, the functions and the like included in the various members, units, and steps may be reordered in any logically consistent way. Furthermore, units or steps may be combined into one or divided.

Much of the subject matter of this disclosure is described as a series of operations executed by a computer system and other hardware that can execute program instructions. Examples of the computer system and other hardware include a general-purpose computer, a Personal Computer (PC), a dedicated computer, a workstation, a Personal Communications System (PCS), an electronic notepad, a laptop computer, and other programmable data processing apparatuses. It should be noted that in each embodiment, various operations are executed by a dedicated circuit (for example, individual logical gates interconnected in order to execute a particular function) implemented by program instructions (software), or by a logical block, program module, or the like executed by one or more processors. The one or more processors that execute a logical block, program module, or the like are, for example, one or more of each of the following: a microprocessor, a central processing unit (CPU), an Application Specific Integrated Circuit (ASIC), a Digital Signal Processor (DSP), a Programmable Logic Device (PLD), a Field Programmable Gate Array (FPGA), a controller, a microcontroller, an electronic device, another apparatus designed to be capable of executing the functions disclosed here, and/or a combination of any of the above. The embodiments disclosed herein are, for example, implemented by hardware, software, firmware, middleware, microcode, or a combination of any of these.

The machine-readable, non-transitory storage medium used here may also be configured by a computer-readable, tangible carrier (medium) in the categories of solid-state memory, magnetic disks, and optical discs. Data structures and an appropriate set of computer instructions, such as program modules, for causing a processor to execute the techniques disclosed herein are stored on these media. Examples of computer-readable media include an electrical connection with one or more wires, a magnetic disk storage medium, or other magnetic or optical storage medium (such as a Compact Disc (CD), Digital Versatile Disc (DVD□), and Blu-ray disc□ (DVD, and Blu-ray disc are each a registered trademark in Japan, other countries, or both)), portable computer disk, Random Access Memory (RAM), Read-Only Memory (ROM), rewritable programmable ROM such as EPROM, EEPROM, or flash memory, another tangible storage medium that can store information, or a combination of any of these. The memory may be provided internal and/or external to a processor/processing unit. As used in this disclosure, the term "memory" refers to all types of long-term storage, short-term storage, volatile, non-volatile, or other memory. No limitation is placed on the particular type or number of memories, or on the type of medium for memory storage.

While the disclosed system has a variety of modules and/or units for implementing particular functions, these modules and units have only been indicated schematically in order to briefly illustrate the functionality thereof. It should be noted that no particular hardware and/or software is necessarily indicated. In this way, the various subject matter disclosed herein may be embodied in a variety of forms, and all such embodiments are included in the scope of the subject matter in this disclosure.

REFERENCE SIGNS LIST

11 Solar cell
12 Storage cell
13, 14 DC/DC converter
20 Power control apparatus
21 Inverter
22, 23 Interconnected operation switch
24 Independent operation switch
25 Controller
26 Memory
31 Distribution board
32 Load
33 Power generation apparatus
40 Current sensor
50 Dummy output unit
51 Dummy current load
52 Synchronization switch
53 Dummy current control switch
60 Transformer
70 Second current sensor
100 Power control system

The invention claimed is:

1. A control method for a power control system,
the power control system comprising:
a power generation apparatus configured to generate, while a current sensor detects forward power flow equal to or greater than a threshold, power corresponding to a value detected by the current sensor;
a power control apparatus configured to control distributed power sources including the power generation apparatus; and
a dummy current output unit connected to the power control apparatus, the dummy current output unit capable of supplying the current sensor with dummy current that is current in a same direction as forward power flow;
the control method comprising:
in a state of constant current flowing to a load from the power generation apparatus and the power control apparatus for a predetermined time,
a first step of the power control apparatus increasing the dummy current from the dummy current output unit stepwise; and
after the first step, a second step of storing, as the threshold, a minimum of the forward power flow when output voltage of the power generation apparatus rises.

2. The control method of claim 1, further comprising a third step of measuring the minimum of the forward power flow with the first step a plurality of times and setting generated power of the power generation apparatus based on an average of the minimum measured a plurality of times.

3. The control method of claim 2,
wherein the distributed power sources further include a storage cell;
the control method further comprising a fourth step of starting to charge the storage cell when the output voltage of the power generation apparatus rises.

4. The control method of claim 1,
wherein the distributed power sources further include a storage cell;
the control method further comprising a fourth step of starting to charge the storage cell when the output voltage of the power generation apparatus rises.

5. A power control system comprising:
a power generation apparatus configured to generate, while a current sensor detects forward power flow equal to or greater than a threshold, power corresponding to a value detected by the current sensor;
a power control apparatus configured to control distributed power sources including the power generation apparatus; and
a dummy current output unit connected to the power control apparatus, the dummy current output unit capable of supplying the current sensor with dummy current that is current in a same direction as forward power flow; wherein
the power control apparatus comprises a controller and a memory; and
in a state of constant current flowing to a load from the power generation apparatus and the power control apparatus for a predetermined time,
the controller increases the dummy current stepwise and stores, in the memory as the threshold, a minimum of the forward power flow when output voltage of the power generation apparatus rises.

6. The power control system of claim 5, wherein the controller measures the minimum of the forward power flow a plurality of times and sets generated power of the power generation apparatus based on an average of the minimum measured a plurality of times.

7. The power control system of claim 6, wherein
the distributed power sources further include a storage cell; and
the controller starts to charge the storage cell when the output voltage of the power generation apparatus rises.

8. The power control system of claim 5, wherein
the distributed power sources further include a storage cell; and
the controller starts to charge the storage cell when the output voltage of the power generation apparatus rises.

9. A power control apparatus configured to control distributed power sources that include a power generation apparatus that generates power while a current sensor detects forward power flow equal to or greater than a threshold;
the power control apparatus being connected to a dummy current output unit capable of supplying the current sensor with dummy current that is current in a same direction as forward power flow;
the power control apparatus comprising a controller and a memory; wherein
in a state of constant current flowing to a load from the power generation apparatus and the power control apparatus for a predetermined time,
the controller increases the dummy current from the dummy current output unit stepwise and stores, in the memory as the threshold, a minimum of the forward power flow when output voltage of the power generation apparatus rises.

10. The power control apparatus of claim 9, wherein the controller measures the minimum of the forward power flow a plurality of times and sets generated power of the power generation apparatus based on an average of the minimum measured a plurality of times.

11. The power control apparatus of claim 10, wherein
the distributed power sources further include a storage cell; and
the controller starts to charge the storage cell when the output voltage of the power generation apparatus rises.

12. The power control apparatus of claim 9, wherein
the distributed power sources further include a storage cell; and
the controller starts to charge the storage cell when the output voltage of the power generation apparatus rises.

* * * * *